US007228263B2

United States Patent
Khanna et al.

(10) Patent No.: US 7,228,263 B2
(45) Date of Patent: Jun. 5, 2007

(54) METHOD FOR REPRESENTING ROOT BUSSES USING OBJECT ORIENTED ABSTRACTIONS

(75) Inventors: Rahul Khanna, Beaverton, OR (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1098 days.

(21) Appl. No.: 09/802,787

(22) Filed: Mar. 8, 2001

(65) Prior Publication Data

US 2003/0018464 A1 Jan. 23, 2003

(51) Int. Cl.
*G06F 13/10* (2006.01)
(52) U.S. Cl. .............................. 703/21; 707/103; 710/8; 710/107; 710/313; 719/318
(58) Field of Classification Search .................. 703/21; 710/107, 313, 8; 719/318; 707/103
See application file for complete search history.

(56) References Cited

U.S. PATENT DOCUMENTS 5,727,212 A * 3/1998 Dinallo ........................ 719/321
5,974,474 A * 10/1999 Furner et al. .................. 710/8
6,421,798 B1 * 7/2002 Lin et al. ..................... 714/718
6,748,455 B1 * 6/2004 Hinson et al. ............... 719/318
7,124,226 B2 * 10/2006 Khanna ........................ 710/300

OTHER PUBLICATIONS

The FreeBSD Documentation Project, "FreeBSD Architecture Handbook, Chapter 14 Newbus", Aug. 2000, pp. 194-198.*

* cited by examiner

*Primary Examiner*—Kamini Shah
*Assistant Examiner*—Herng-der Day
(74) *Attorney, Agent, or Firm*—Blakely, Sokoloff, Taylor & Zafman LLP

(57) ABSTRACT

A method for representing root busses and their subordinate bus configurations using an object oriented abstraction scheme that enables various system components to communication with peripheral devices attached to the root busses and their subordinate busses without requiring specific knowledge of the access mechanisms of those devices. During the initialization process of a platform, a core dispatcher loads a PCI bus plug-in (PPI) for each entity that can create a root bus. When the plug-in for an entity is loaded, it produces a GUIDed object called a GRB (GUID of PPI for Root Bus) that provides an abstracted representation of the root buss's configuration and resources. The GRB includes a plurality of components including driver methods that are registered with the core authority, which then publishes the GRB to enable access to the methods and resources. An enumeration process is performed on each root bus in a system to determine its configuration and resources through use of the methods.

21 Claims, 6 Drawing Sheets

APPENDIX

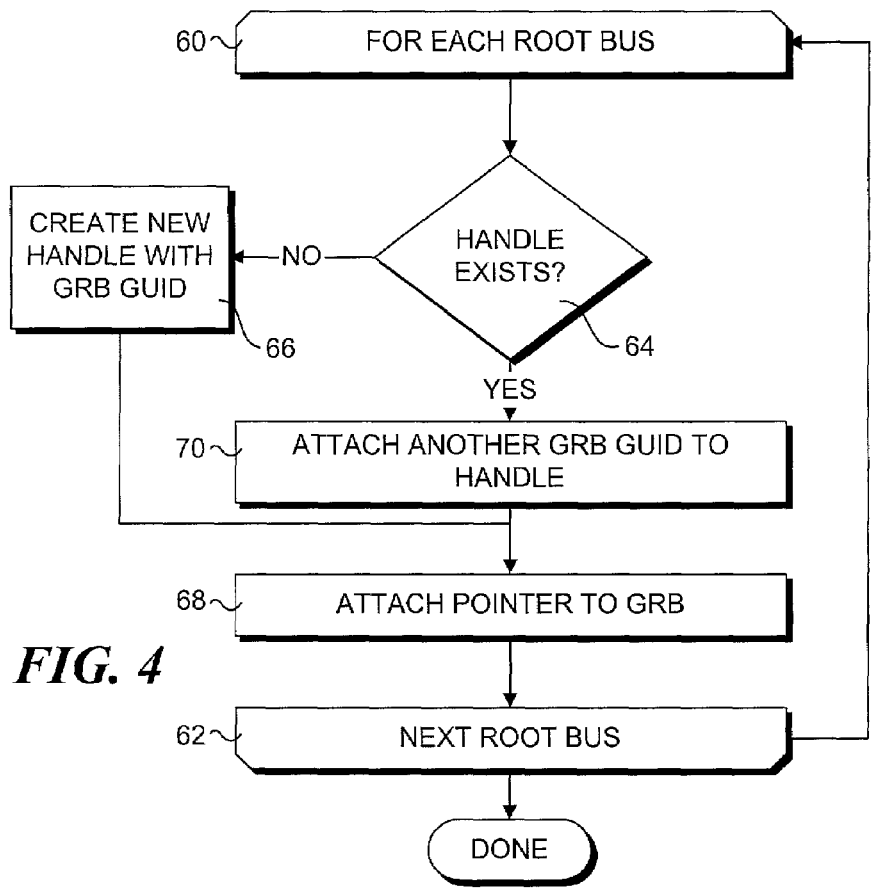
FIG. 4
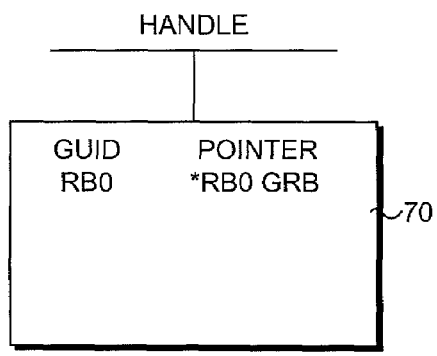
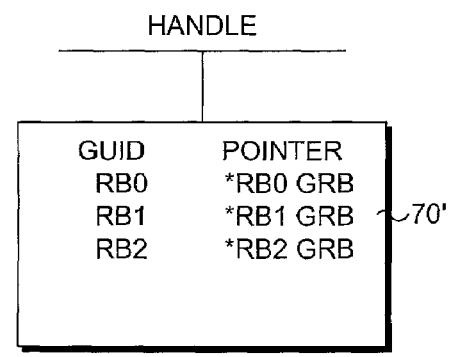
FIG. 5A          FIG. 5B

METHOD FOR REPRESENTING ROOT BUSSES USING OBJECT ORIENTED ABSTRACTIONS

BACKGROUND OF THE INVENTION

1. Field of the Invention

The present invention generally concerns computer busses and corresponding configuration methods, and in more particular concerns a scheme for representing the configuration of computer busses using object oriented abstractions.

2. Background Information

A typical computer platform, such as a personal computer, workstation, or server, generally includes one type of primary or "root" bus that is used for communicating with various peripheral devices, such as the PCI bus in newer computers, and the ISA bus in earlier PCs. Other well-known earlier busses include the EISA bus and the Micro-channel bus. These earlier busses are known as "legacy" busses.

A primary problem with legacy busses is that they are difficult to configure. This was one of the motivations for developing the PCI bus, which introduced "plug and play" functionality. Plug and play functionality enables operating systems and other computer software and hardware to become apprised of a PCI peripheral's capabilities and characteristics. For example, on a first reboot an operating system may be able to determine that a PCI card that was installed prior to the reboot is a video card or modem with certain characteristics, and may further automatically configure the device, including identifying appropriate device drivers. This has enhanced usability of computers with PCI buses, especially when the computers are used by people with little or no technical background.

While configuring PCI devices on a signal root bus is generally handled well by today's computers, it is anticipated that more powerful computers and servers will be introduced that support a variety of different interface and peripheral types through the use of multiple root busses. In some configurations, these root busses may comprise fundamentally different types of root busses. At present, the particular requirements of the chipset that control the each root bus are usually needed to configure the bus. In more particular, it is usually necessary to determine access mechanisms, resource constraints, I/O access mechanisms and/or parent-child relationships to configure the bus. With the introduction of the Intel 870 chipset, Infiniband bus protocol, and IA-64, the process for controlling and configuration root busses will likely become even more complicated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a flowchart for illustrating the logic used by the invention when creating a handle in which information corresponding to the GUIDed object is stored;

FIG. 5A shows a handle after the loop in the flowchart of FIG. 4 has been executed for a first GUIDed object;

FIG. 5B shows the handle of FIG. 5A after all of the root busses in the exemplary multiple bus configuration of FIG. 2 have been evaluated by the loop of FIG. 4;

DETAILED DESCRIPTION

The present invention provides a method for representing root busses and their subordinate bus configurations using an object oriented abstraction scheme that enables various system components to communicate with peripheral devices attached to the root busses and their subordinate busses without requiring specific knowledge of the access mechanisms of those devices. During the initialization process of a platform, a core dispatcher loads a PCI bus plug-in for each entity that can create a root bus. When the plug-in for an entity is loaded, it may produce a GUIDed object called a GRB (GUID of PPI for Root Bus) that provides an abstracted representation of the root buss's configuration and resources. The GRB includes a plurality of components including driver methods that may be used to enumerate the root bus corresponding to the GRB. Once the GRB is created, it is published to enable access to devices in the root bus's hierarchy.

Since multiple root busses may have multiple root-bus access mechanisms, resource constraints, parent-child associations, special mechanisms to enable/disable root busses, and/or separate I/O access mechanisms, each entity defines these components through an object definition for its corresponding root bus. During a root bus enumeration process, all the GRBs corresponding to respective root busses in a system are searched in via the core. Once all of the GRBs are identified, then subordinate busses and devices for each root bus are enumerated through use of the GRB's access mechanisms, resource constraints, I/O access mechanisms, and parent-child relationships published for that root bus.

Figure 1:
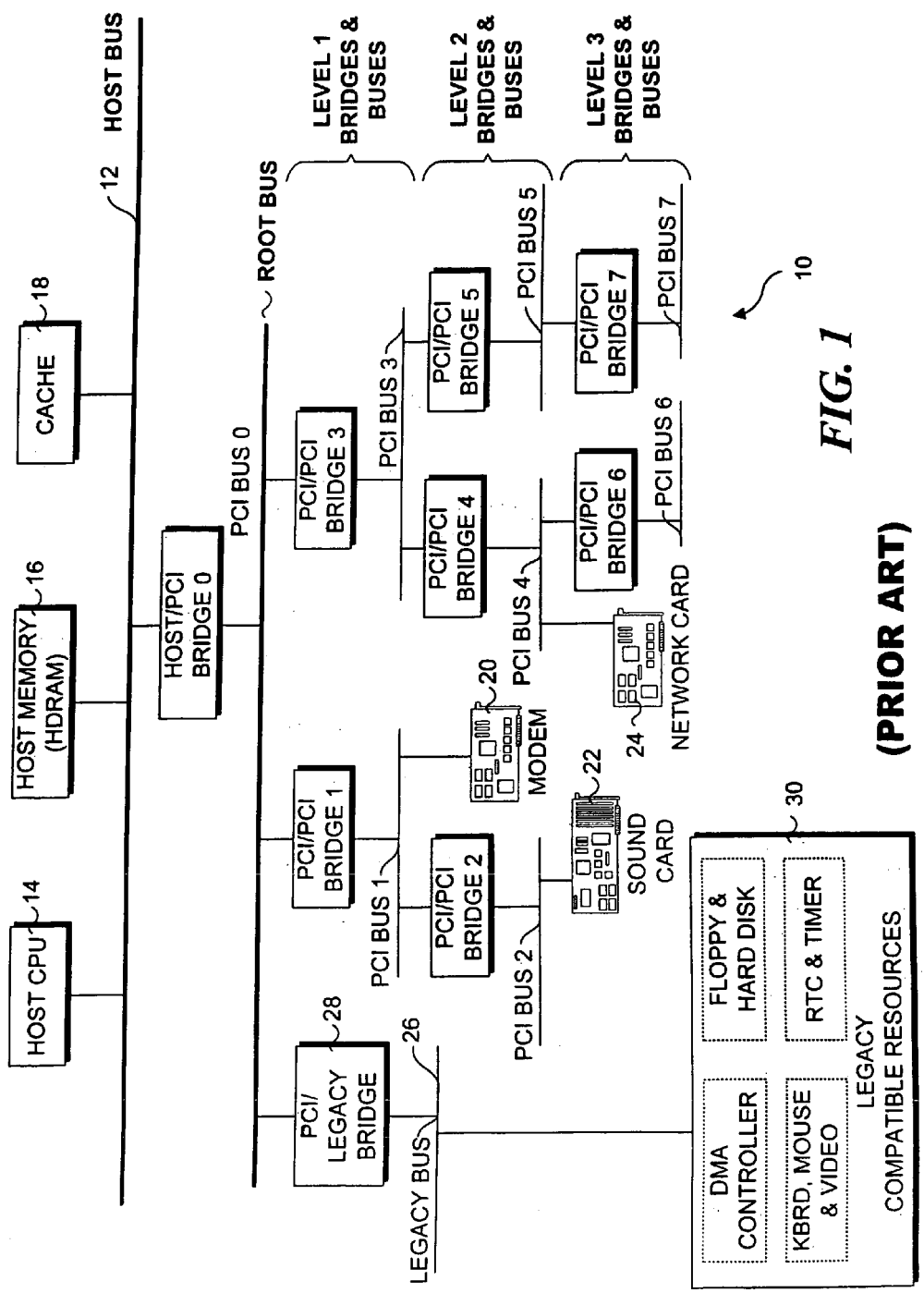
FIG. 1 is a schematic block diagram illustrating a multiple layer bus configuration.

FIG. 1 shows a portion of a typical bus configuration 10 that includes a PCI-type type root bus depicted as PCI bus 0. Although the following description concerns the use of PCI root busses in particular, it will be understood that the principles and techniques of the present invention disclosed herein may be applied to other types of root busses as well. Bus configuration 10 includes a host bus 12 to which a host CPU 14, host memory 16, and cache 18 are connected. In general, for a given system host CPU 14 will be the primary bus master for the system, and will be used to service interrupt and handle system errors. Typical processors that may be used for host CPU 14 include the INTEL Pentium™ class processors, as well as processors made by other manufacturers including Motorola, IBM, SUN, and Hewlett-Packard.

As illustrated in FIG. 1, the various busses in a system comprise a hierarchy that includes one or more levels, wherein busses at a lower level are subordinate to busses at a higher level. The first subordinate bus level below the host bus is the root bus, which comprises a PCI Bus 0 in bus configuration 10. Additional levels depicted in FIG. 1 include a level 1, a level 2, and a level 3.

Busses between levels are enabled to communicate with one another through use of "bridges." The primary purpose of a "bridge" is to interface one bus protocol to another. The protocol includes the definition of the bus control signals lines, and data and address sizes. For example, a host/PCI bridge 0 is used to enable communication between host bus 12 and PCI bus 0. Under conventional terminology, a bridge is labeled to correspond to its subordinate bus, i.e., a bridge "n" will corresponding to a PCI Bus "n" or other type of Bus "n." When a bridge interfaces similar bus types, the bridge primarily limits the loading on each bus. Instances of these types of bridges are illustrated by the various PCI/PCI bridges in FIG. 1. Bus configuration 10 also includes several PCI peripheral devices, including a modem 20, a sound card 22, and a network card 24. For clarity, many of the busses shown in bus configuration 10 are depicted as not being connected to any devices; it will be recognized that each of the busses may support one or more devices, and the principles of the invention may be applied to any of the busses, regardless of its configuration.

In order to interface with ISA peripherals and other legacy components, a legacy bus 26 is provided, which communicates with PCI bus 0 via a PCI/legacy bridge 28. Under another common configuration, a legacy bus may be connected directly to a host bus using an appropriate host bus/legacy bus bridge. The legacy bus enables the system to use various legacy devices and peripherals, such as ISA cards, legacy disk controllers, keyboards, mice, and video cards, as depicted in a legacy device block 30. Under many systems, the legacy bus must be enabled prior to other busses to successfully boot the systems.

Figure 2:
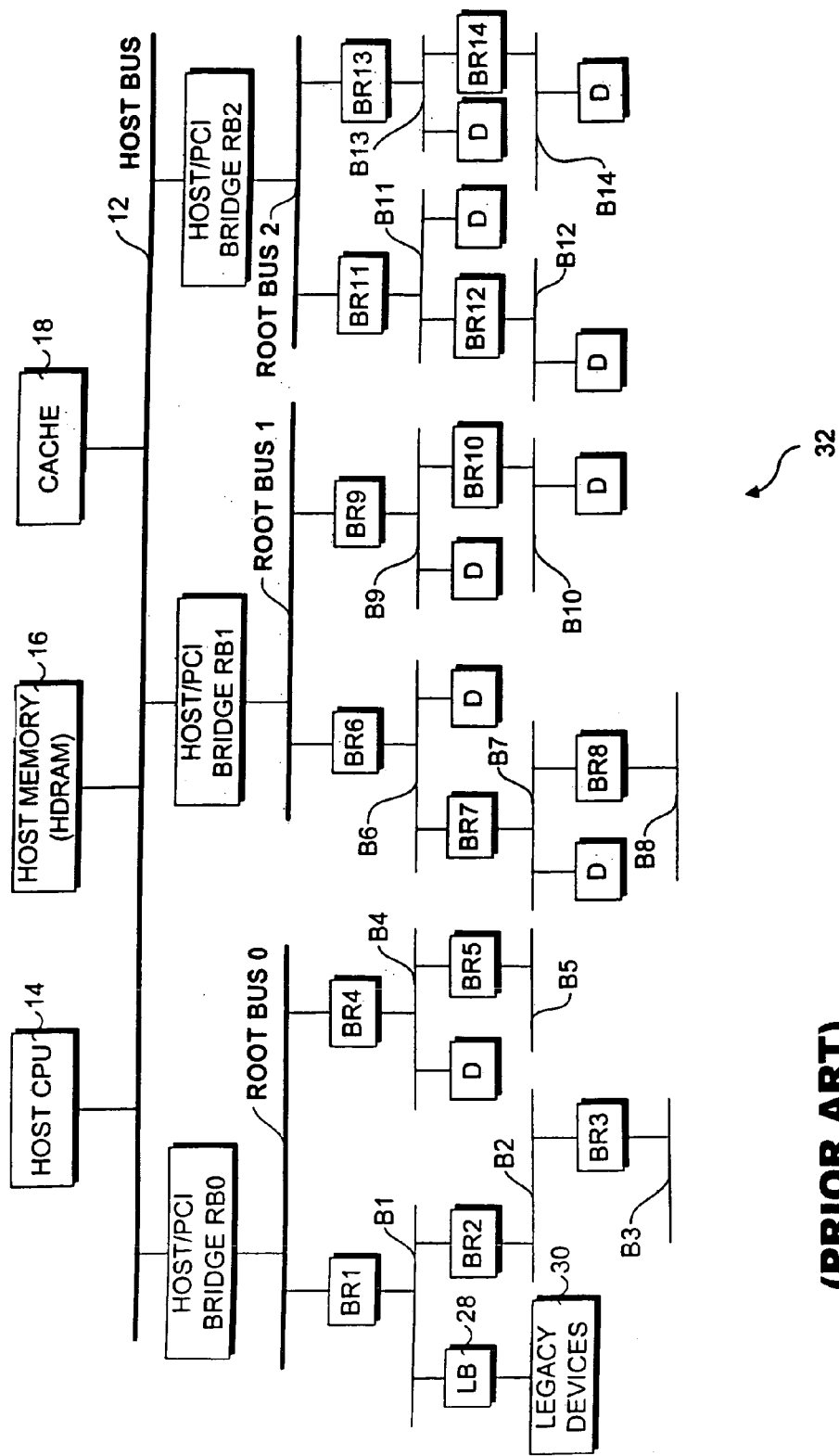
FIG. 2 is a schematic block diagram illustrating an exemplary multiple bus configuration.

FIG. 2 illustrates an exemplary multiple root bus configuration 32 that includes three root busses, respectively labeled root bus 0, root bus 1, and root bus 2. Each root bus includes several layers of subordinate busses connected by corresponding bridges, which are identified by the blocks labeled "BR#" in FIG. 2. In addition, various devices, depicted as blocks containing a "D," are also included in configuration 32, as well as legacy devices 30 and a PCI-to-Legacy bridge 28.

In order for host CPU 14 and the various other components in the system to access each other, a configuration needs to be defined for each root bus that includes access mechanisms, I/O requirements, etc. The present invention provides an abstracted representation of a root bus configuration and resources that enables various components (e.g., CPU(s), application programs, peripheral devices) in a system to access other components such as disk controllers, video cards, sound cards, modems, etc. through a set of GUIDed objects, each corresponding to a respective root bus to which the components are directly or indirectly connected.

Figure 3:
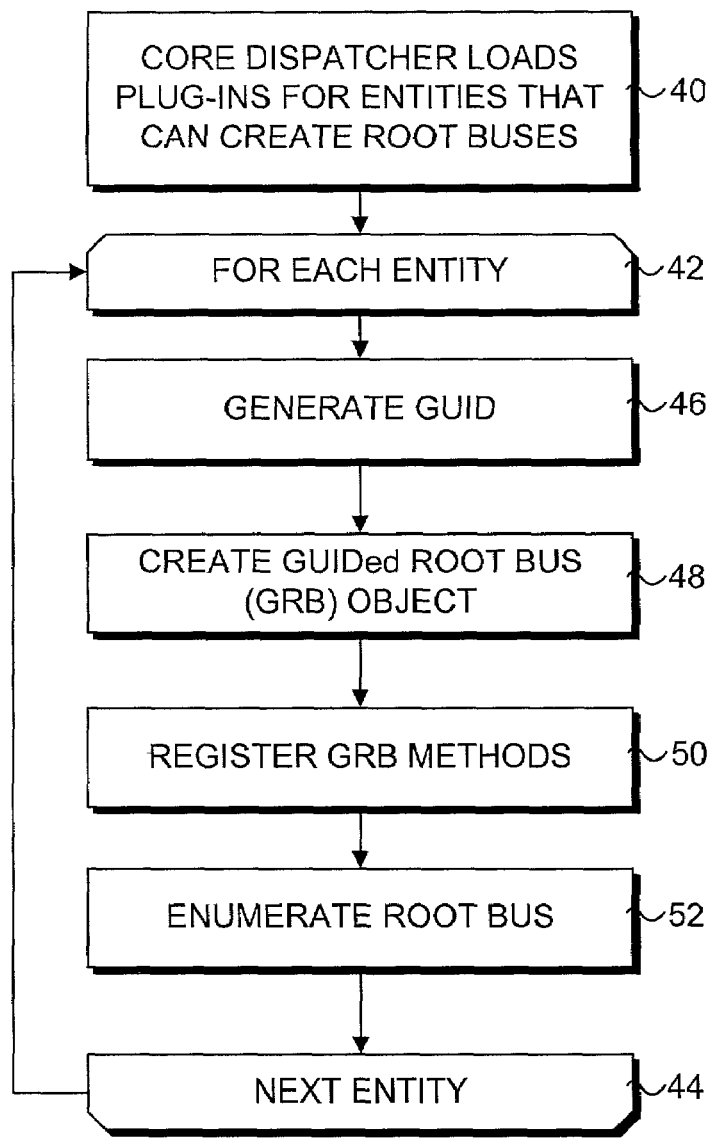
FIG. 3 is a flowchart for illustrating the logic used by the invention when creating a GUIDed object comprising an objected-oriented representation of each root bus in a system.

With reference to FIG. 3, a process for creating the GUIDed objects begins in a block 40 in which a core dispatcher loads plug-ins (i.e., software drivers) for entities that can create root busses. The core dispatcher comprises a core software component that is responsible for initializing and/or registering a plug-in. The entities that can create root busses typically may include chipsets that are used to control access to a root bus. For example, many PCI busses are controlled by an Intel 82870 chipset. The loading of plug-ins generally may occur during the POST (power-on self-test) operation of the platform, or optionally during a similar platform initialization operation.

As depicted by respective start loop and end loop blocks 42 and 44, a loop comprising several operations is performed for each entity, as follows. First, a GUID is generated in a block 46. Next, a GUIDed Root Bus (GRB) object is created in a block 48 comprising an object-oriented abstraction that identifies a plurality of methods that may be used to determine the configuration and resource requirements of a corresponding root bus, and includes one or more variables in which configuration and resource information can be stored, either directly, or through data identified by those variables (e.g., stored in a subordinate class that references the GRB). Preferably, the abstracted object may be represented by a C++ or Java class definition. The GRB object is identified by the GUID, and thus is referred to herein as a GUIDed object.

An exemplary GRB is presented below:

| GRB (GUID of PPI for ROOT BUS) |
|---|
| Struct GRB { <br>     Struct GRB *Next;    // Needed for ordered initialization <br>     Boolean MustBeBusZero;   // At most ON in one element, Must be 1$^{st}$ element if ON <br>     UINT32 PrimaryBus; <br>     UINT32 SubordinateBus; <br>     // Methods <br>     PCIConfigRead( ); <br>     PCIConfigWrite( ); <br>     PCISetPriSubBus( ); <br>     PCIGetPriSubBus( ); <br>     PCISetIOAperture( ); <br>     PCIGetIOAperture( ); <br>     PCISetMemAperture( ); <br>     PCIGetMemAperture( ); <br>     PCIPushResourceAmount( ); <br>     AllocResourceAmount( ); <br>     DoneResourceAlloc( ); <br> } |

The GRB is identified by its GUID, which is simply the name of the GRB. The GRB's methods may be obtained through publication of the GRB by the plug-in for the entity, or by interrogating the plug-in.

After the GRB's methods are determined, the methods are registered with the core in a block 50. Using the GRB and its registered methods, the root bus corresponding to the GRB is then enumerated in a block 52, and the logic proceeds to evaluate the root bus corresponding to the next entity. Once all of the root busses are evaluated in this manner, the process is complete.

Registration of each GRB and its associated methods comprises storing information in memory using an abstracted data structure comprising a handle that includes the GUIDs for the GRBs and a pointer to each GRB's memory location. With reference to FIG. 4, this task is performed by looped process that is used during the registration of each root bus, as provided by respective start loop and end loop block 60 and 62. In a decision block 64 a determination is made to whether a handle has been allocated to store the registration information. During the first pass, a handle will not yet have been allocated, and so the answer to decision block 64 will be no, and the logic will proceed to a block 66 in which a new handle will be created with the GUID for GRB of the first root bus that is evaluated. The logic then proceeds to a block 68 in which a pointer to the GRB is attached opposite the GRB's GUID in the handle. At this point, the handle appears as a handle 70 depicted in FIG. 5A, which includes a first GUID entry (RB0) that identifies the GRB, and a corresponding pointer (*RB0 GRB) to the GRB.

The logic proceeds to end loop block 62, completing the evaluation of the first root bus, and loops back to start loop block 60 to begin processing the second root bus. In this instance, since a handle has already been created, the answer to decision block 64 will be yes, and the logic will proceed to a block 72 in which a second GRB GUID (RB1) is attached to the handle. The logic then flows to block 68, wherein a pointer to the GRB (*RB1 GRB) is attached, as before. A similar process is applied to each of the remaining root buses (in this case RB2), producing a handle 70', as shown in FIG. 5B. After all of the root busses have been evaluated in this manner, registration is complete.

As discussed above, the each root bus is enumerated to identify a configuration of its subordinate busses, and any devices attached to those busses. Root bus enumeration is performed through use of the methods that were previously registered for each root bus. This process implements a programmatic mechanism to detect and/or identify peer PCI busses and child devices/busses including all add-on devices and accompanying optional (OP) ROMs. A configuration process is then performed by collecting resource requirements for each device and subordinate bus, and allocating/resolving the resources to those devices and busses dynamically without conflicts.

Preferably, the enumeration is initiated by accessing the chipset code, which knows how many root PCI busses are there. Resources for the compliant PCI devices can be determined by accessing PCI config space and doesn't require device initialization. The allocation of resources is, in essence, recursive with each bus requiring all the resources of its subordinates. The host to root bus bridge may also have to abstract I/O access mechanisms to the root bus in situations where the I/O access for the root bus is not the standard 0xCF8.

Figure 6:
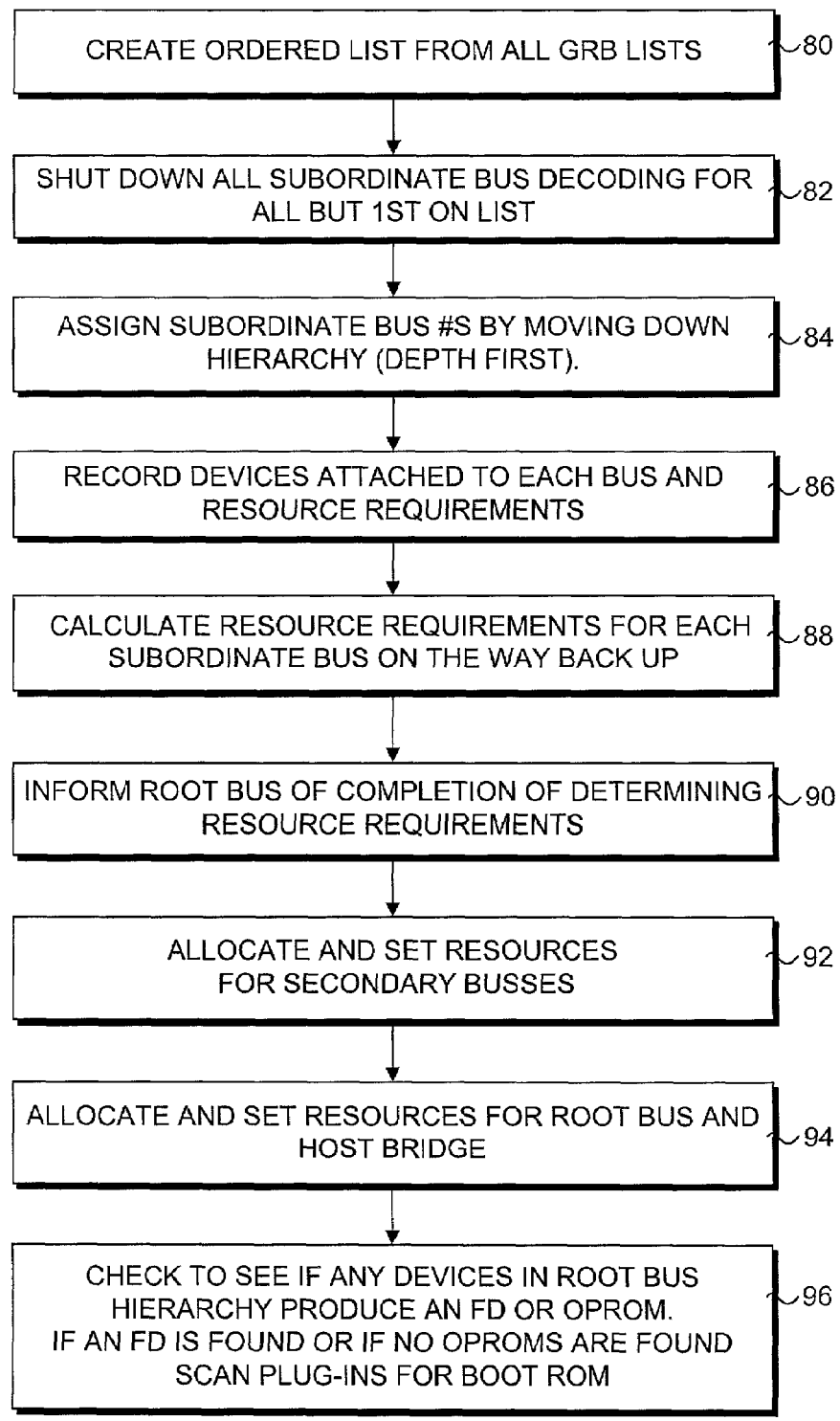
FIG. 6 is a flowchart illustrating the logic used by the invention when enumerating root busses.

With reference to the flowchart of FIG. 6, the enumeration process is now discussed with a description of functions performed by each block in the flowchart and an exemplary code segment for implementing each function. The enumeration process begins in a block 80 in which an ordered list of GRB's is generated. This is accomplished by retrieving the handle for a first GRB, and then extracting the other GRB's that are included in the handle:

NUM_GRB=SearchByGUID(GRB);
STRUCT GRB *Starting_GRB=createGRBLinkList (NUM_GRB);

Next, in a block 82, all subordinate bus decoding for all but the root bus corresponding to the first GRB in the list are shut down:

```
Struct GRB *G = Starting_GRB->Next;
For(int I=1;I<Num_GRB;I++){
    G->PCIBusDecode( 0 );
    G=G->Next;
}
```

Bus numbers are then assigned for subordinate busses by traversing down each root bus hierarchy by depth first, as provided by a block 84. For example, with respect to Root Bus 0 of FIG. 2, subordinate buses B1, B2, and B3 are first enumerated, followed by buses B4 and B5. During this process, device and resource requirements are recorded in a block 86. The resource requirements for each bus are then determined in a block 88 by retracing the hierarchy from the bottom back toward the top. The following code segment is used to perform the functions of blocks 84, 86, and 88:

```
G = Starting_GRB->Next;
    REQ_ID=0;
    Prim_Bus=0;
For(int I=0;I<Num_GRB;I++){
    G->PCIBusDecode( 1 );
    G->PrimaryBus=Prim_Bus;
//Enumerate and Set all Primary, Secondary, Subordinate Busses for GRB
//according to PCI Bridge Specification.
    G->SubordinateBUS = Enumerate&SetPCIBus( G );
//Set the Root & Subordinate Busses for the Chipset producing GRB
    G-> PCISetPriSubBus (G->PrimaryBus, &(G->SubordinateBUS),
    NULL);
```

The resource requirements for a parent bus include all of the resource requirements of its child (i.e., subordinate) bus(es) and devices. Accordingly, the resource requirements are "pushed up" during this process:

```
/* Push resources for all the BUSSES on GRB, starting with the
Highest BUS GetResourceRequirement( ) will create RESOURCE
structure for PCIPushResourceAmount( ); */
For( int I = G->SubordinateBUS, REQ_ID=0; I=Prim_Bus; I--
    ,REQ_ID++){
    STRUCT *RESOURCE = GetResourceRequirement( G, I );
    G->PCIPushResourceAmount ( I , REQ_ID, RESOURCE);
}
```

In a block 90, the root bus is informed of the completion of the determination of resource requirements. This will help the producer of the GRB (e.g., a bus chipset) compensate for various types of resource requirements:

G->DoneResourceAlloc( );

In a block 92, resources are allocated and set for the subordinate busses:

```
/* Start Receiving the Resources for all the BUSSES except ROOT BUS from the producer of
GRB) by its REQ_ID. At each step PCI Resource Registers and appropriate Bridge
parameters should be set. This may involve storing some sort of relationship between
Secondary Bus Number and BusDeviceFunction Number of the P2P Bridge. */
    STRUCT RESOURCE *RES
        For( int I = G->SubordinateBUS, REQ_ID=0; I=Prim_Bus+1; I--,
            REQ_ID++){
//Get the Resources for the Devices corresponding to Secondary BUS.
        G->AllocResourceAmount ( I , REQ_ID, RES);
/* Set all the Resources corresponding to the Devices on the Secondary Side of the PCI BUS
```

```
        and
            P2P Bridge producing the Secondary BUS. */
            SetPCIResource( G, I, RES );
            SetPCIBridgeParameters( G , I );
            }
```

The resources are then allocated and set for the root bus and host bridge assigned to the root bus in a block 94:

G->AllocResourceAmount (Prim_Bus, REQ_ID, RES);
SetPCIResource(G, Prim_Bus, RES);
STRUCT APERTURE_DESC A=CalcPrimBusApertureBase&Limits(G, Prim_Bus);
G->PCISetIOAperture (Prim_Bus, A.NUMBER_ADDRESS_BITS, &(A.IO_BASE_ADDRESS), &(A.IO_LIMIT_ADDRESS));
G->PCISetMemAperture (Prim_Bus, A.NUMBER_MEMORY_ADDRESS_BITS, A.NUMBER_PREF_MEMORY_ADDRESS_BITS, &(A.MEMORY_BASE_ADDRESS), &(A.MEMORY_LIMIT_ADDRESS), &(A.PREF_MEMORY_BASE_ADDRESS), &(A.PREF_MEMORY_LIMIT_ADDRESS));

It is desired to determine if any devices connected directly or indirectly to the root bus (i.e., devices in the root bus hierarchy) are boot devices. Accordingly, a check for such is made in a block 96, wherein a search for devices that produce a firmware device (FD) or an OPROM (optional ROM) is performed. OPROMs are typically found on various peripheral cards that may control a boot or storage device, such as SCSI controllers. If an FD is found or if no OP ROM(s) are found, the plug-ins are scanned to identify a boot ROM for the root bus. These functions may be performed as follows:

```
Device_List=0;
For( int I = G->SubordinateBUS; I=Prim_Bus; I--){
    GetPCIDevices( I , G , Device_List)
    Device=Device_List->DEVFn;
    GUID*    DEV_GUID=0;
    While(Device != 0){
        OPROM_TYPE = GetOpromFDStatus( G , I, Device,
        DEV_GUID)
        Switch(OPROM_TYPE){
Case OPROM:    I->NewPlugin (GetBaseAddress (G,I,Device));
        Break;
Case FD:    I->NewFd (GetBaseAddress(G,I,Device),
GetFDLength(G,I,Device));
Case NONE:    I->LocatePlugins (ByClass,
&PCIClassPlugInGUID,
            *SizeGuidList, *GuidList);
DEV_GUID,ID = MatchDevice&GUID
(G,I,Device,*GUIDList)
    Break;
    }
}
if(DEV_GUID !=0)
```

After enumerating the first root bus, the foregoing functions are performed for other root busses corresponding to the GRB list generated in block 80 (e.g., root bus 1 and root bus 2 for configuration 32).

Method Prototypes

The following discussion discloses an exemplary set of method prototypes corresponding to the code segments presented above. These examples correspond to C++ method prototypes. However, other object-oriented languages may also be used, such as Java.

| PCIConfigRead( ) Method | | |
|---|---|---|
| Prototype | | |
| TIANO_STATUS | | |
| PCIConfigRead ( | | |
| IN | UINT32 | ACCESS_GRANULARITY |
| IN | UINT32 | BUS_NUMBER, |
| IN | UINT32 | DEVICE_NUMBER, |
| IN | UINT32 | FUNCTION_NUMBER, |
| IN | UINT32 | REGISTER_OFFSET, |
| IN | REGISTER_SIZE | SIZE, |
| OUT | VOID | *BUFFER, |
| ) | | |
| Parameters | | |
| ACCESS_GRANULARITY | | Read/Write Granularity in Number of Bytes. |
| BUS_NUMBER | | PCI Bus Number |
| DEVICE_NUMBER | | PCI Device Number |
| FUNCTION_NUMBER | | PCI Function Number |
| REGISTER_OFFSET | | PCI Starting Register |
| SIZE | | Total BYTE Sized Registers to be read. |
| *BUFFER | | Buffer pointer to accommodate all registers. |

This function is used to read PCI config space for a particular GRB. SIZE corresponds to number of bytes to be expected starting from register offset. Register Read may be requested at a non-aligned boundaries. The function reads data starting at the Register offset (REGISTER_OFFSET).

| PCIConfigWrite( ) Method | | |
|---|---|---|
| Prototype | | |
| TIANO_STATUS | | |
| PCIConfigWrite ( | | |
| IN | UINT32 | ACCESS_GRANULARITY |
| IN | UINT32 | BUS_NUMBER, |
| IN | UINT32 | DEVICE_NUMBER, |
| IN | UINT32 | FUNCTION_NUMBER, |
| IN | UINT32 | REGISTER_OFFSET, |
| IN | REGISTER_SIZE | SIZE, |
| IN | VOID | *BUFFER |
| ) | | |
| Parameters | | |
| ACCESS_GRANULARITY | | Read/Write Granularity in Number of Bytes. |
| BUS_NUMBER | | PCI Bus Number |
| DEVICE_NUMBER | | PCI Device Number |
| FUNCTION_NUMBER | | PCI Function Number |
| REGISTER_OFFSET | | PCI Starting Register |
| SIZE | | Total BYTE Sized Registers to be read. |
| *BUFFER | | Buffer pointer to accommodate all registers. |

This function is used to write PCI config space for a particular GRB. SIZE corresponds to number of bytes to be written starting from register offset. Register Write may be requested at non-aligned boundaries. The fimction writes data starting at the Register offset (REGISTER_OFFSET).

---

PCIShutBusDecode( ) Method

Prototype

```
TIANO_STATUS
    PCIShutBusDecode ( IN BOOLDECODE_TYPE )
    DECODE_TYPE      0       ENABLE
                     1       DISABLE
```

---

This function is used to shutdown/enable PCI decode on ROOT BUS corresponding to GRB.

---

PCISetPriSubBus( ) Method

Prototype

```
TIANO_STATUS
PCISetPriSubBus (
IN    UINT32   ROOT_BUS_NUMBER      // ROOT
IN    UINT32   *NUM_SUBORDINATE_BUS // Optional
OUT   UINT32   *SUBORDINATE_BUS
)
```

Parameters

| | |
|---|---|
| ROOT_BUS_NUMBER | PCI ROOT Bus for which we need to set the subordinate BUS Number. |
| *NUM_SUBORDINATE_BUS | Pointer to Subordinate Bus Number (if available). If null then chipset has an option to flag an error or recurs itself to calculate subordinate bus. In that case it should also set all primary, secondary and subordinate busses for all PCI Bridges under that ROOT BUS. |
| *SUBORDINATE_BUS | Pointer to Returned value of Subordinate Bus Number |

---

This function sets the Root/Subordinate Bus Number for the Root Bus. If NUM_SUBORDINATE_BUS is Zero, it enumerates all the busses underneath the Root Bus and sets Primary, Secondary, and Subordinate Busses. If Non-Zero, it set's Subordinate Bus to NUM_SUBORDINATE_BUS.

---

PCIGetPriSubBus( ) Method

Prototype

```
TIANO_STATUS
PCIGetPriSubBus (
OUT   UINT32   *ROOT_BUS_NUMBER       // ROOT
OUT   UINT32   *ROOT_SUB_BUS_NUMBER
               //Subordinate
)
```

Parameters

| | |
|---|---|
| *ROOT_BUS_NUMBER | Bus Number for PCI ROOT BUS |
| *ROOT_SUB_BUS_NUMBER | Subordinate Bus Number. |

---

This function gets the Subordinate Bus/Root Bus Numbers for this GRB.

---

PCISetIOAperture( ) Method

Prototype

```
TIANO_STATUS
PCISetIOAperture (
    IN    UINT32    PCI_BUS_NUMBER,      //ROOT
    IN    UINT32    NUMBER_ADDRESS_BITS,
    IN    UINT64    *IO_BASE_ADDRESS,
    IN    UINT64    *IO_LIMIT_ADDRESS
)
```

Parameters

| | |
|---|---|
| PCI_BUS_NUMBER | BUS Number of a PCI ROOT BUS |
| NUMBER_ADDRESS_BITS | Total Number of IO address bits (16, 32, 64 etc . . . ) |
| *IO_BASE_ADDRESS | Pointer to IO Base Address. |
| *IO_LIMIT_ADDRESS | Pointer to IO Limit Address. |

---

This function sets IO BASE ADDRESS and IO LIMITS REGISTER for a ROOT BUS. It is noted that IO_LIMIT ADDRESS can be less than the IO_BASE_ADDRESS. Addresses can be 16 bit or 32 bit based upon NUMBER_ADDRESS_BITS. This function is mainly used to set the Aperture for the ROOT BUS. The request to set the Aperture on any other PCI Bus may be rejected.

---

PCIGetIOAperture( ) Method

Prototype

```
TIANO_STATUS
PCIGetIOAperture (
    IN     UINT32    PCI_BUS_NUMBER,       //ROOT
    OUT    UINT32    *NUMBER_IO_ADDRESS_BITS,
    OUT    UINT64    *IO_BASE_ADDRESS,
    OUT    UINT64    *IO_LIMIT_ADDRESS
)
```

Parameters

| | |
|---|---|
| PCI_BUS_NUMBER | PCI Root Bus |
| *NUMBER_ADDRESS_BITS | Returned Total Number of IO address bits (16, 32, 64 etc . . . ) |
| *IO_BASE_ADDRESS | Returned Pointer to IO Base Address. |
| *IO_LIMIT_ADDRESS | Returned Pointer to IO Limit Address. |

---

This function gets IO_BASE_ADDRESS and IO LIMITS REGISTER for ROOT BUS. It is noted that IO_LIMIT_ADDRESS can be less than the IO_BASE_ADDRESS. Addresses can be 16 bit or 32 bit based upon NUMBER_ADDRESS_BITS. This function is mainly used to get the IO Aperture for the Root Bus. The request to get the Aperture on any other PCI Bus may be rejected.

---

PCISetMemAperture( ) Method

Prototype

```
TIANO_STATUS
PCISetMemAperture (
IN    UINT32    PCI_BUS_NUMBER,    // ROOT BUS
IN    UINT32    NUMBER_MEMORY_ADDRESS_BITS,
IN    UINT32    NUMBER_PREF_MEMORY_ADDRESS_BITS,
IN    VOID      *MEMORY_BASE_ADDRESS,
IN    VOID      *MEMORY_LIMIT_ADDRESS,
IN    VOID      *PREF_MEMORY_BASE_ADDRESS,
IN    VOID      *PREF_MEMORY_LIMIT_ADDRESS
)
```

| PCISetMemAperture( ) Method | |
|---|---|
| Parameters | |
| PCI_BUS_NUMBER | PCI Root Bus |
| NUMBER_MEMORY_ADDRESS_BITS | Size of non-prefetchable address in bits |
| NUMBER_PREF_MEMORY_ADDRESS_BITS | Size of prefetchable address in bits |
| *MEMORY_BASE_ADDRESS | Non-Prefetchable base Address |
| *MEMORY_LIMIT_ADDRESS | Non-Prefetchable Limit Address |
| *PREF_MEMORY_BASE_ADDRESS | Prefetchable base Address |
| *PREF_MEMORY_LIMIT_ADDRESS | Prefetchable Limit Address |

This function sets MEMORY and a PREFETCHABLE MEMORY BASE ADDRESS and LIMITS REGISTER for a ROOT BUS. It is noted that MEMORY_LIMIT_ADDRESS can be less than the MEMORY_BASE_ADDRESS. Addresses can be 16 bit or 32 bit or 64 bit based upon NUMBER_ADDRESS_BITS.

| PCIGetMemAperture( ) Method | | |
|---|---|---|
| Prototype | | |
| TIANO_STATUS | | |
| PCIGetMemAperture ( | | |
| IN UINT32 | PCI_BUS_NUMBER, | // ROOT BUS |
| OUT UINT32 | NUMBER_MEMORY_ADDRESS_BITS, | |
| OUT UINT32 | NUMBER_PREF_MEMORY_ADDRESS_BITS, | |
| OUT VOID | *MEMORY_BASE_ADDRESS, | |
| OUT VOID | *MEMORY_LIMIT_ADDRESS, | |
| OUT VOID | *PREF_MEMORY_BASE_ADDRESS, | |
| OUT VOID | *PREF_MEMORY_LIMIT_ADDRESS | |
| ) | | |
| Parameters | | |
| PCI_BUS_NUMBER | PCI Root Bus | |
| *NUMBER_MEMORY_ADDRESS_BITS | Size of non-prefetchable address in bits | |
| *NUMBER_PREF_MEMORY_ADDRESS_BITS | Size of prefetchable address in bits | |
| *MEMORY_BASE_ADDRESS | Non-Prefetchable base Address | |
| *MEMORY_LIMIT_ADDRESS | Non-Prefetchable Limit Address | |
| *PREF_MEMORY_BASE_ADDRESS | Prefetchable base Address | |
| *PREF_MEMORY_LIMIT_ADDRESS | Prefetchable Limit Address | |

This function gets MEMORY BASE ADDRESSES and LIMITS REGISTERS for the ROOT BUS. It is noted that MEMORY_LIMIT_ADDRESS can be less than the MEMORY_BASE_ADDRESS. Addresses can be 16 bit or 32 bit or 64 bit based upon NUMBER_MEMORY_ADDRESS_BITS and NUMBER_PREF_MEMORY_ADDRESS_BITS. NUMBER_PREF_MEMORY_ADDRESS_BITS and NUMBER_MEMORY_ADDRESS_BITS refer to the total number of bits required for addressing.

| PCIPushResourceAmount( ) Method | | |
|---|---|---|
| Prototype | | |
| TIANO_STATUS | | |
| PCIPushResourceAmount ( | | |
| IN | UINT32 | PCI_BUS_NUMBER, |
| IN | UINT32 | REQUEST_ID, |
| IN | RESOURCE | *RESOURCE |
| ) | | |
| Parameters | | |
| PCI_BUS_NUMBER | Secondary PCI BUS ID of a P2P Bridge. | |
| REQUEST_ID | Random Request ID. This may be required to retrieve the requested resources. | |
| *RESOURCE | Pointer to the Resource Structure. | |
| Related Definitions | | |
| typedef struct { | | |
|    RESOURCE_TYPE | TYPE, | |
|    UINT32 | RESOURCE_SIZE, | |
|    UINT32 | NUMBER_ADDRESS_BITS, | |
|    RESOURCE_DESC | *RESOURCE_ADDRESS, // Static Allocation | |
|    RESOURCE | *NEXT_RESOURCE // Link Next Resource | |
| } RESOURCE; | | |
| TYPE | Type of a resource defined by RESOURCE_TYPE. | |
| RESOURCE_SIZE | Total Size of this resource in Bytes. | |
| NUMBER_ADDRESS_BITS | Size of address bits of this resource. | |
| *RESOURCE_ADDRESS | Pointer to the Base Address ,Range of a resource if STATIC allocation is requires. By default this field should be NULL. The Static allocation requirements are defined by RESOURCE_DESC structure. | |
| *NEXT_RESOURCE | Pointer to next Resource Requirement Structure (RESOURCE) | |
| typedef struct{ | | |
|    VOID | *RESOURCE_BASE_ADDR, // Don't Care if Zero | |
|    VOID | *RESOURCE_RANGE_ADDR , // Don't Care if Zero | |
|    VOID | *RESOURCE DESC // LL of other Ranges | |
| } RESOURCE_DESC | | |
| *RESOURCE_BASE_ADDR | Static Base Address of the required resource/range | |
| *RESOURCE_RANGE_ADDR | Static End Address of the required resource/range. | |
| *RESOURCE_DESC | Pointer to next possible allocable Range. | |
| typedef enum{ | | |
|    IO_RESOURCE, | | |
|    MEMORY_RESOURCE, | | |
|    PREF_MEMORY_RESOURCE, | | |
|    IRQ_RESOURCE, | | |
|    OTHER | | |
| } RESOURCE_TYPE; | | |

This function is required to push the RESOURCE requirements to the PCI_BUS referred to as PCI_BUS_NUMBER. This is then automatically pushed to PCI_BUS_NUMBER's primary bus and so on. The process stops when it reaches the ROOTBUS. To push resources to the TIANO RESOURCE ALLOCATOR beyond the ROOT BUS (GRB), the DoneResourceAlloc ( ) function is used. The resource amount is given as a link list of all types of resources that need to be pushed. This can also be accomplished by repeating PCIPushResourceAmount an appropriate number of times. In cases where static resources are needed to be setup, RESOURCE_ADDRESS field may be used. Otherwise, the field may be NULL. RESOURCE_RANGE_ADDRESS and RESOURCE_BASE_ADDRESS creates an applicable range of address that can be used for allocation. RESOURCE_DESC acts as a link-list of possible collection of resource ranges. Only one Range should be used and others should be discarded. At any time RESOURCE_BASE_ADDRESS+RESOURCE_SIZE should be less than or equal to RESOURCE_RANGE_ADDRESS.

| AllocResourceAmount( ) Method | | |
|---|---|---|
| Prototype | | |
| TIANO_STATUS | | |
| AllocResourceAmt ( | | |
|     IN | UINT32 | PCI_BUS_NUMBER, |
|     IN | UINT32 | REQUEST_ID, |
|     OUT | RESOURCE | *RECV_RESOURCE |
| ) | | |
| Parameters | | |
| PCI_BUS_NUMBER | Secondary PCI BUS ID of a P2P Bridge. | |
| REQUEST_ID | Request ID used in PCIPushResourceAmount( ). | |
| *RECV_RESOURCE | Pointer RESOURCE Structure returned by the call. | |

This function is responsible for getting the Resources from it's parent. Request requires a unique REQUEST_ID. This is the same ID that was used to push up the resource request by PCIPushResourceAmount ( ). Since a Resource Allocation cannot be expected without it's parent knowing about it, REQUEST_ID has to be registered with the Parent BUS to get the Resources allocated.

DoneResourceAlloc( ) Method
  Prototype
  TIANO_STATUS
  DoneResourceAlloc (VOID)

This function is responsible for indicating the completion of resource requirement pushup algorithm.

Exemplary System for Implementing the Invention

Figure 7:
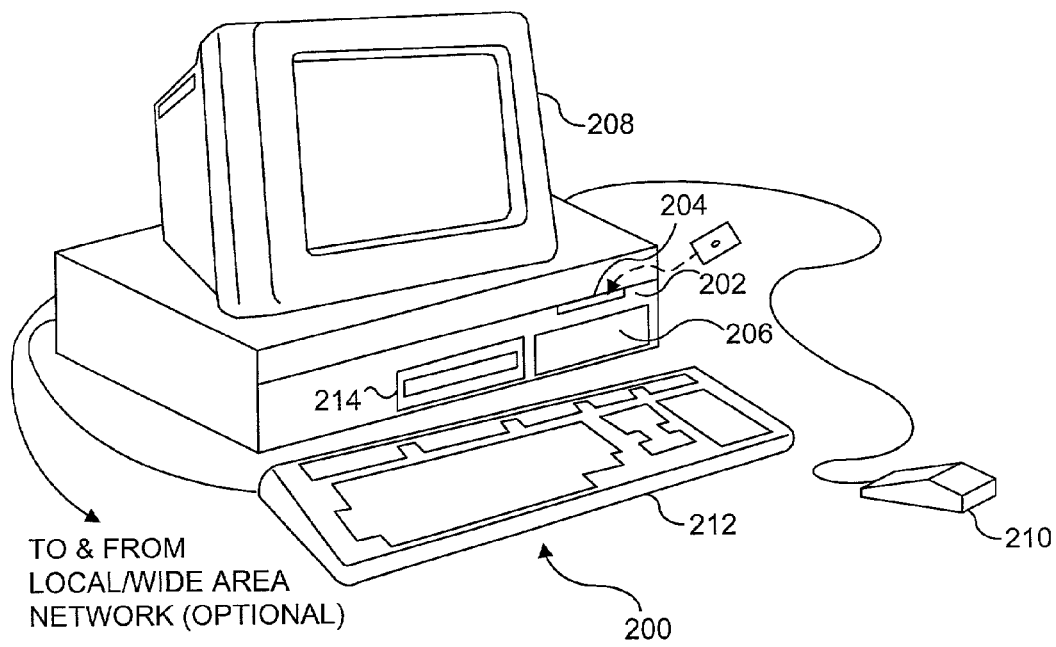
FIG. 7 is a schematic diagram illustrating an exemplary system for implementing the invention.

With reference to FIG. 7, a generally conventional personal computer 200 is illustrated, which is suitable for use in connection with practicing the present invention. Alternatively, a corresponding server, or workstation on a local area network may be used for executing machine instructions comprising a computer program that causes the present invention to be executed. Personal computer 200 includes a processor chassis 202 in which are mounted a floppy disk drive 204, a hard drive 206, a motherboard populated with appropriate integrated circuits (not shown), and a power supply (also not shown), as are generally well known to those of ordinary skill in the art. A monitor 208 is included for displaying graphics and text generated by software programs that are run by the personal computer, and for graphically representing models of objects produced by the present invention. A mouse 210 (or other pointing device) is connected to a serial port (or to a bus port) on the rear of processor chassis 202, and signals from mouse 210 are conveyed to the motherboard to control a cursor on the display and to select text, menu options, and graphic components displayed on monitor 208 by software programs executing on the personal computer. In addition, a keyboard 212 is coupled to the motherboard for user entry of text and commands that affect the running of software programs executing on the personal computer.

Personal computer 200 also optionally includes a compact disk-read only memory (CD-ROM) drive 214 into which a CD-ROM disk may be inserted so that executable files and data on the disk can be read for transfer into the memory and/or into storage on hard drive 206 of personal computer 200. Other mass memory storage devices such as an optical recorded medium or DVD drive may be included. The machine instructions comprising the software program and/or modules that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, the software may be downloaded from a network.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A method, comprising:
generating an object-oriented abstraction corresponding to a root bus referencing a method that obtains and/or generates configuration and resource allocation information for the root bus and a subordinate bus connected to the root bus; and
registering the method referenced in the object-oriented abstraction via a data structure stored in a memory, the data structure including a globally unique identifier (GUID) of the root bus, a handle that includes the GUID and stores a reference to the GUID of the root bus, and a pointer to the root bus.

2. The method of claim 1, wherein the object-oriented abstraction comprises one of a C++ object or Java object.

3. The method of claim 1, wherein the root bus comprises a PCI bus.

4. The method of claim 1, further comprising enumerating the root bus and said subordinate bus through use of the method that is registered.

5. The method of claim 4, wherein the object-oriented abstraction includes at least one variable for storing information, further comprising storing configuration information derived during enumeration of the root bus into said at least one variable.

6. The method of claim 5, further comprising allocating resources for the root bus, the subordinate bus, and a device attached to the root and subordinate busses; and
storing information corresponding to resources that are allocated in said at least one variable for storing information.

7. The method of claim 1, wherein functions of the root bus are controlled, at least in part, by a chipset having a plug-in driver, further comprising interrogating the plug-in driver to identify said method.

8. The method of claim 1, wherein functions of the root bus are controlled, at least in part, by a chipset having a plug-in driver, further comprising publishing the object-oriented abstraction via the plug-in driver.

9. A method comprising:
identifying each of a plurality of root buses;
defining an object oriented representation of each root bus comprising a set of components that includes references to a plurality of methods that obtain and/or generate configuration and resource allocation information for that root bus and at least a subordinate bus connected to the root bus;

assigning a bus identifier for the at least subordinate bus through use of an enumeration process that implements one or more of the methods referenced by the object oriented representation of the root bus, the object oriented representation including a globally unique identifier (GUID) for each root bus;

creating a handle; and storing references corresponding to the GUIDs for each root bus in the handle.

10. The method of claim 9, wherein the handle further includes indicia for each GUID identifying a location or the object oriented representation corresponding to the GUID.

11. The method of claim 10, wherein the indicia comprises a pointer to the memory address at which the object oriented representation is stored.

12. The method of claim 9, wherein each root bus and the at least subordinate bus connected to the root bus form a hierarchy, and wherein the enumeration process for each root bus comprises:

assigning bus identifiers as the at least subordinate bus is reached while moving downward through the hierarchy; and calculating resource requirements for the at least subordinate bus while moving back up the hierarchy.

13. The method of claim 9, further comprising:

determining resource requirements for the at least subordinate bus;

allocating the resource requirements for the at least subordinate bus; and setting resources for the at least subordinate bus.

14. The method of claim 13, wherein the at least subordinate bus has a peripheral device connected to it, and further wherein determining the resource requirements for the at least subordinate bus includes determining the resource requirements of a peripheral device attached to the at least subordinate bus.

15. The method of claim 13, further comprising:

allocating resources for the root bus based in part on the resources of the at least subordinate bus; and setting the resources for the root bus.

16. The method of claim 9, further comprising:

evaluating devices in the hierarchy of the root bus to determine if the root bus produces a firmware device or an optional ROM that includes BIOS corresponding to a bootable device.

17. An article of manufacture comprising a computer-readable medium having computer-executable instructions that when executed perform operations comprising:

generating an object-oriented abstraction corresponding to a root bus referencing a method that obtains and/or generates configuration and resource allocation information for the root bus and a subordinate bus connected to the root bus;

registering the method referenced in the object-oriented abstraction via a data structure including a globally unique identifier (GUID) of the root bus and a pointer to the root bus;

creating a handle; and storing references corresponding to the globally unique identifier (GUID) for the object-oriented abstraction and a pointer to the object-oriented abstraction in the handle.

18. The article of manufacture of claim 17, wherein the computer-executable instructions comprises one or more software modules including a root bus driver.

19. The article of manufacture of claim 17, wherein execution of the instructions further performs operations comprising assigning a bus identifier for the subordinate bus through use of an enumeration process that implements the method referenced by the object oriented abstraction of the root bus.

20. The article of manufacture of claim 19, wherein the root bus and the subordinate bus connected to the root bus form a hierarchy, and wherein the enumeration process for the root bus comprises:

assigning bus identifiers as the subordinate bus is reached while moving downward through the hierarchy; and calculating resource requirements for the subordinate bus while moving back up the hierarchy.

21. The article of manufacture of claim 20, wherein execution of the instructions further performs the functions of:

determining resource requirements for the subordinate bus;

allocating the resource requirements for the subordinate bus; and assigning resources that are allocated to the root bus that is a parent of the subordinate bus.

* * * * *